US005784030A

United States Patent [19]

Lane et al.

[11] Patent Number: 5,784,030

[45] Date of Patent: Jul. 21, 1998

[54] CALIBRATION METHOD FOR SATELLITE COMMUNICATIONS PAYLOADS USING HYBRID MATRICES

[75] Inventors: Steven O. Lane; Douglas T. Bell, both of Torrance; Kary L. O'Connor, Long Beach, all of Calif.

[73] Assignee: Hughes Electronics Corporation, El Segundo, Calif.

[21] Appl. No.: 656,974

[22] Filed: Jun. 6, 1996

[51] Int. Cl.[6] ............ H01Q 3/22; G01S 7/40

[52] U.S. Cl. ............ 342/373; 342/174

[58] Field of Search ............ 342/360, 373, 342/174, 377; 343/703

[56] References Cited

U.S. PATENT DOCUMENTS

| | | | |
|---|---|---|---|
| 4,532,518 | 7/1985 | Gaglione et al. | 342/372 |
| 4,618,831 | 10/1986 | Egami | 330/124 R |
| 4,907,004 | 3/1990 | Zacharatos et al. | 342/373 |
| 4,994,813 | 2/1991 | Shiramatsu et al. | 342/360 |
| 5,115,248 | 5/1992 | Roederer | 342/373 |
| 5,122,806 | 6/1992 | Julian | 342/173 |
| 5,625,624 | 4/1997 | Rosen et al. | 370/307 |

*Primary Examiner*—Gregory C. Issing
*Attorney, Agent, or Firm*—Terje Gudmestad; Elizabeth E. Leitereg; Michael W. Sales

[57] ABSTRACT

A communication payload system for a satellite having a beam forming network, an amplifier associated with each output port of the beam forming network, and a plurality of hybrid matrices and a calibration pick-up antenna. Each hybrid matrix has a plurality of inputs connected to selected amplifiers and a corresponding number of outputs. One output of each hybrid matrix is connected to a power absorber adapted to function as an output calibration port producing a calibration sample and the remaining outputs connected to feed radiating elements. A calibration system applies power to selected output ports and calculates calibration corrections in response to the values of the calibration samples and the values of the power radiated by each feed radiating element which are applied to the beam forming network to maintain the calibration of the payload system.

13 Claims, 4 Drawing Sheets

CALIBRATION METHOD FOR SATELLITE COMMUNICATIONS PAYLOADS USING HYBRID MATRICES

TECHNICAL FIELD

The invention is related to satellite communications payloads and, in particular, to a system and method for the calibration of satellite communications payloads.

BACKGROUND ART

Satellite communication systems permit the establishment of circuits or communication channels in wide service areas and effectively allow the use of a small number of circuits by a large number of earth bound stations. Typical of such satellite communication systems are described by Roederer in U.S. Pat. No. 5,115,248, Zacharatos et al. in U.S. Pat. No. 4,907,004 and Egami et al. in U.S. Pat. No. 4,618,831.

One fundamental requirement of the design of a communication system for satellites is an efficient use of the available R. F. power.

A conventional prior art satellite communications payload system is shown in FIG. 1. The payload system has a beam forming network 10 of conventional design which produces multiple outputs in response to one or more inputs. Each input is mapped to selected output ports with an appropriate gain and phase shift therebetween. Each output port of the beam forming network 10 is connected to the input of an associated amplifier 12. The outputs of selected groups of amplifier 12 are connected to the inputs of associated hybrid matrices 14-1 through 14-N. In the illustrated embodiment, each hybrid matrix 14-1 through 14-N has four inputs and the associated group of amplifiers has four amplifiers 12, one connected to each of the four inputs. In a like manner, each hybrid matrix has four outputs, each of which is connected to a feed radiating element 18. The feed radiating elements 18 are placed at the focal point of a beam focusing device, such as a parabolic reflector 20.

For efficient operation, there is a need to maintain the calibration of the payload system.

DISCLOSURE OF THE INVENTION

The invention is a communication payload system including a calibration system for measuring and maintaining the amplitude and phase transfer functions of the system within calibration. The payload system has a beam forming network having at least one input port and a plurality of output ports. Each input port is mapped to one or more selected output ports. The beam forming network provides an appropriate amplitude distribution and phase shift between the input ports and the output ports. An amplifier is connected to each output port of the beam forming network. The system includes at least one hybrid matrix having each of its inputs connected to a respective one of the amplifiers. A calibration RF absorbing load is connected to one of the outputs of each of the hybrid matrices. The calibration RF absorbing load functions as a calibration sample output port producing a calibration sample corresponding to the power output of the hybrid matrix. A calibration circuit provides power inputs to the beam forming network to generate signals at selected output ports of a beam forming network and generates corrections thereto in response to the calibration samples measured at the calibration sample output ports and a calibration pick-up antenna responsive to the power radiated by feed radiating elements. The calibration corrections are applied to the beam forming network to maintain the calibration of the communication payload system.

The object of the invention is to provide a calibration system for a communication payload system.

Another object of the invention is to provide extra outputs for the hybrid matrices that can be used for calibration.

Another object of the invention is to increase the number of amplifiers for additional output power and increased payload effective isotropic radiated power (EIRP) without increasing the power output of the individual amplifiers.

Another object of the invention is that the communication payload system be adaptable to any payload containing multiple beams, multiple amplifier and hybrid matrices that require calibration.

Still another object of the invention is the use of normally loaded output ports of the hybrid matrices to provide a sample of the power in the hybrid matrix for the calibration of the payload system.

These and other objects, features, and advantages of the present invention will become readily apparent from a reading of the specification in conjunction with the drawings.

BEST MODE FOR CARRYING OUT THE INVENTION

Figure 1:
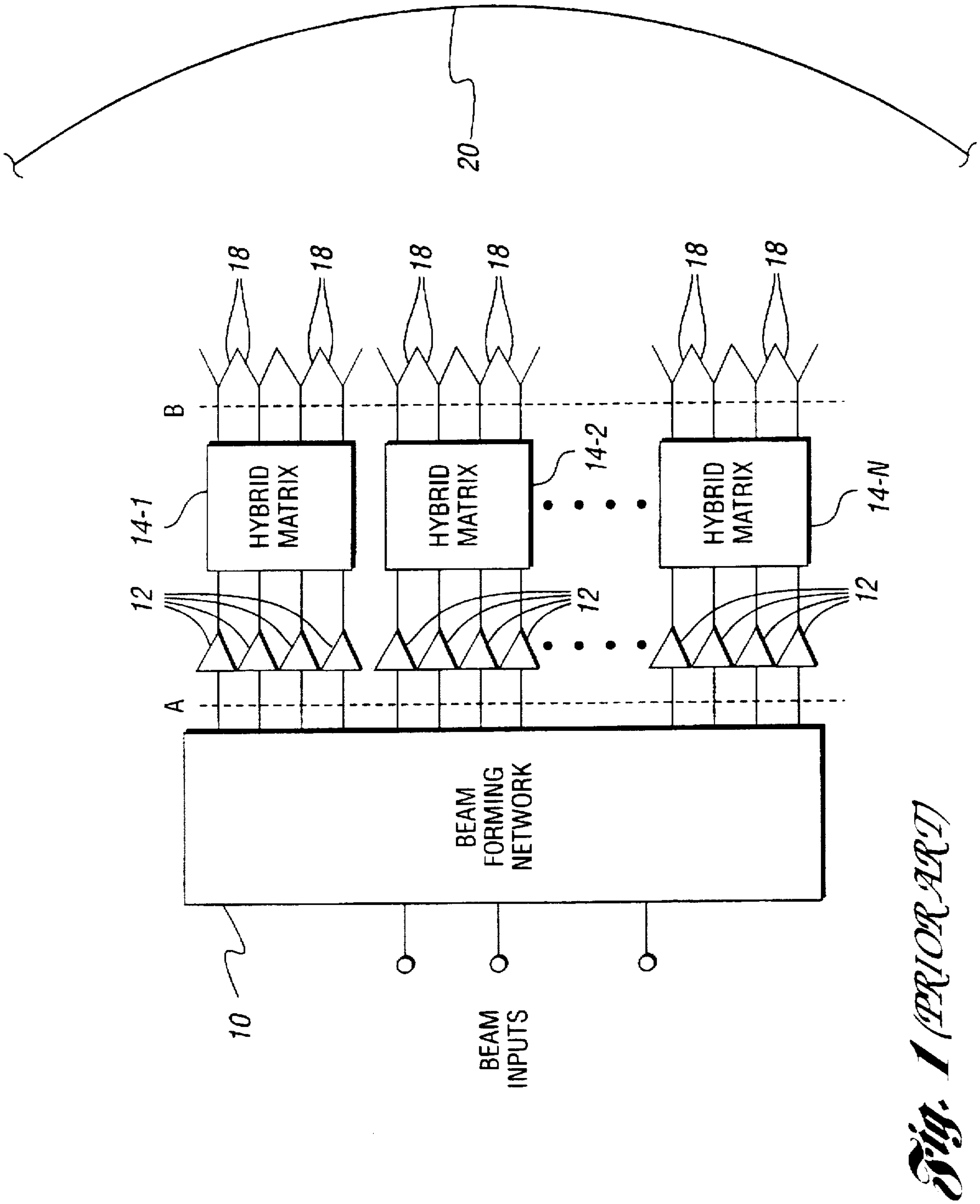
Fig. 1 (PRIOR ART)
FIG. 1 is a block diagram of a prior art communication payload system.
Figure 2:
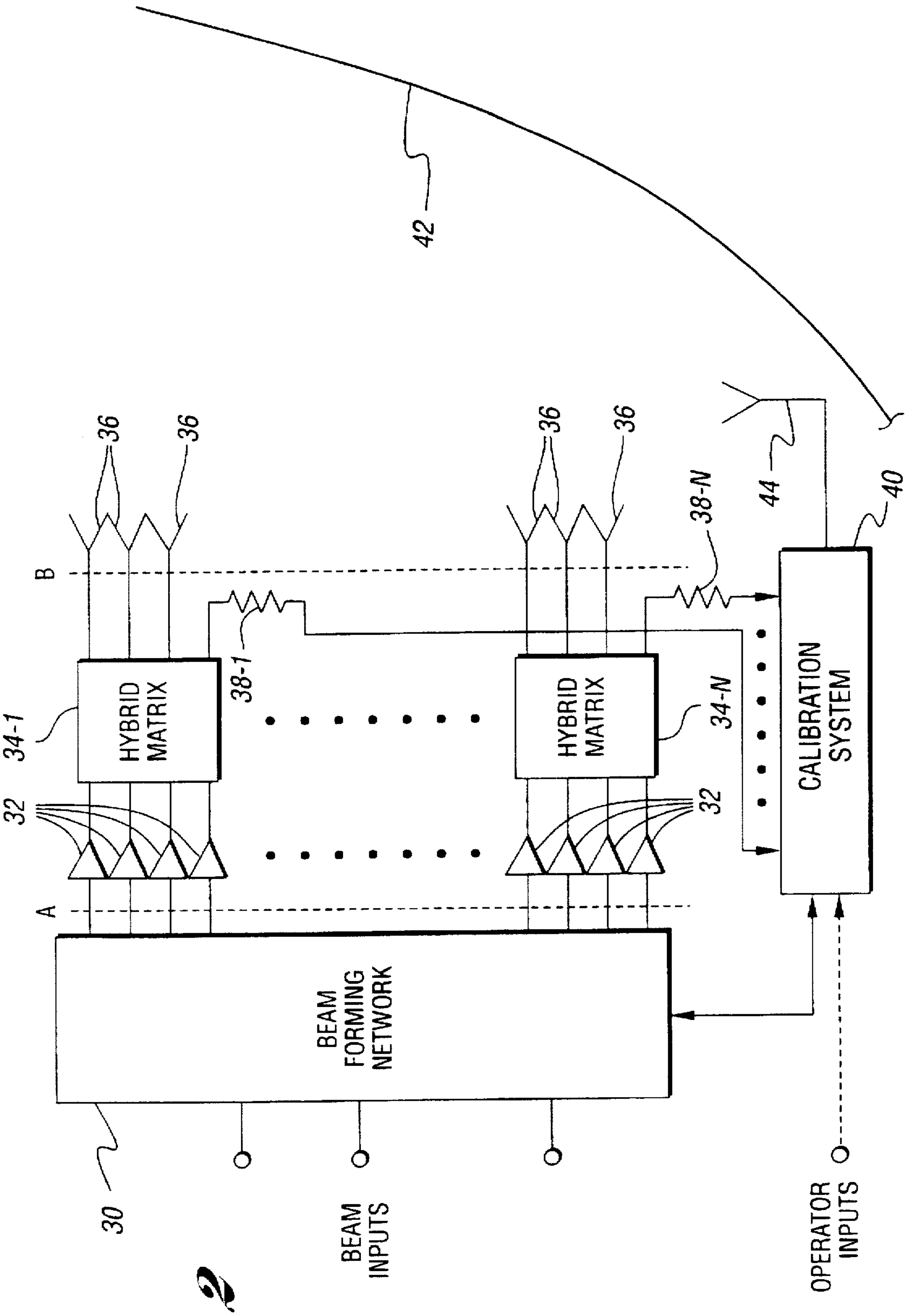
FIG. 2 is a block diagram of the communication payload system according to the present invention.

The details of the system for calibration of satellite communications payloads is shown in FIG. 2. The beam input or inputs are received by a beam forming network 30 as previously described with reference to FIG. 1. The beam forming network 30 produces multiple outputs at its output ports identified as A in FIG. 2 in response to each input. Each input maps to several of the output ports with appropriate attenuation and phase shift therebetween. Each output port of the beam forming network 30 is connected to the input of an associated amplifier 32. The outputs of selected groups of amplifiers 32 are connected to the inputs of associated hybrid matrices 34-1 through 34-N. As in the embodiment discussed relative to FIG. 1, each hybrid matrix 34-1 through 34-N has four inputs and the associated group of amplifiers has four amplifiers 32, one connected to each of the four inputs, respectively. Each hybrid matrix 34 has four outputs as shown, but unlike the embodiment shown in FIG. 1, only three of its outputs are connected to feed radiating elements 36. As taught by the prior art, each hybrid matrix may have more than the four inputs and more than the four outputs illustrated in the embodiment of FIG. 2.

Conventionally, the unused outputs from the hybrid matrix 34-1 through 34-N are terminated with an RF absorbing load as taught by Roederer in U.S. Pat. No. 5,155,248 with reference to FIGS. 10B, 14B and 18B. In accordance with the teachings of the invention, the RF absorbing loads 38-1 through 38-N are modified to function as calibration output ports so that calibration samples of the power received by the RF absorbing loads 38-1 through 38-N are generated. These calibration samples of the power output from the unused outputs of the hybrid matrices 34-1 through 34-N and the output of a calibration pick-up antenna 44 are received by a calibration system 40 which measures the amplitude and phase transfer characteristics of the payload system both before and after the hybrid matrices 34.

The measurement of the amplitude and phase transfer characteristics before the hybrid matrices is accomplished by applying power at a single beam forming network output port and measuring the power at the calibration output port. An estimate of the error in the phase transfer characteristics from the single beam forming network output port to the calibration output port is obtained by subtracting the measured value from a predetermined reference value. This predetermined reference value may be the value obtained from a preceding measurement or a theoretical value. This process is repeated for each output port of the beam forming network.

Next, the beam forming network 30 may be activated by the calibration system 40 to produce power at its output ports that result in power being applied to only one of the feed radiating elements which is detected by the calibration pick-up antenna 44. The signal detected by the calibration pick-up antenna is compared with predetermined values to determine the phase transfer function of the payload system to the feed radiating elements 36. This process is likewise repeated for each feed radiating element. The combination of the two measured phase transfer functions determines the transfer function of the payload.

The calibration system 40 periodically activates the beam forming network 30 to power selected output ports and generates corrections applied to the beam forming network in response to the values generated at the calibration output ports 38 and the calibration pick-up antenna to maintain the calibration of the payload system. The calibration of the payload system may be automatically performed at routine intervals or may be initiated by a ground based station As shown in FIG. 2. the feed radiating elements 36 are located at or near the focal point of a parabolic-shaped reflector 42 which focuses the energy radiated by the feed radiating elements 36 in one or more beams as is known in the art.

Figure 3:
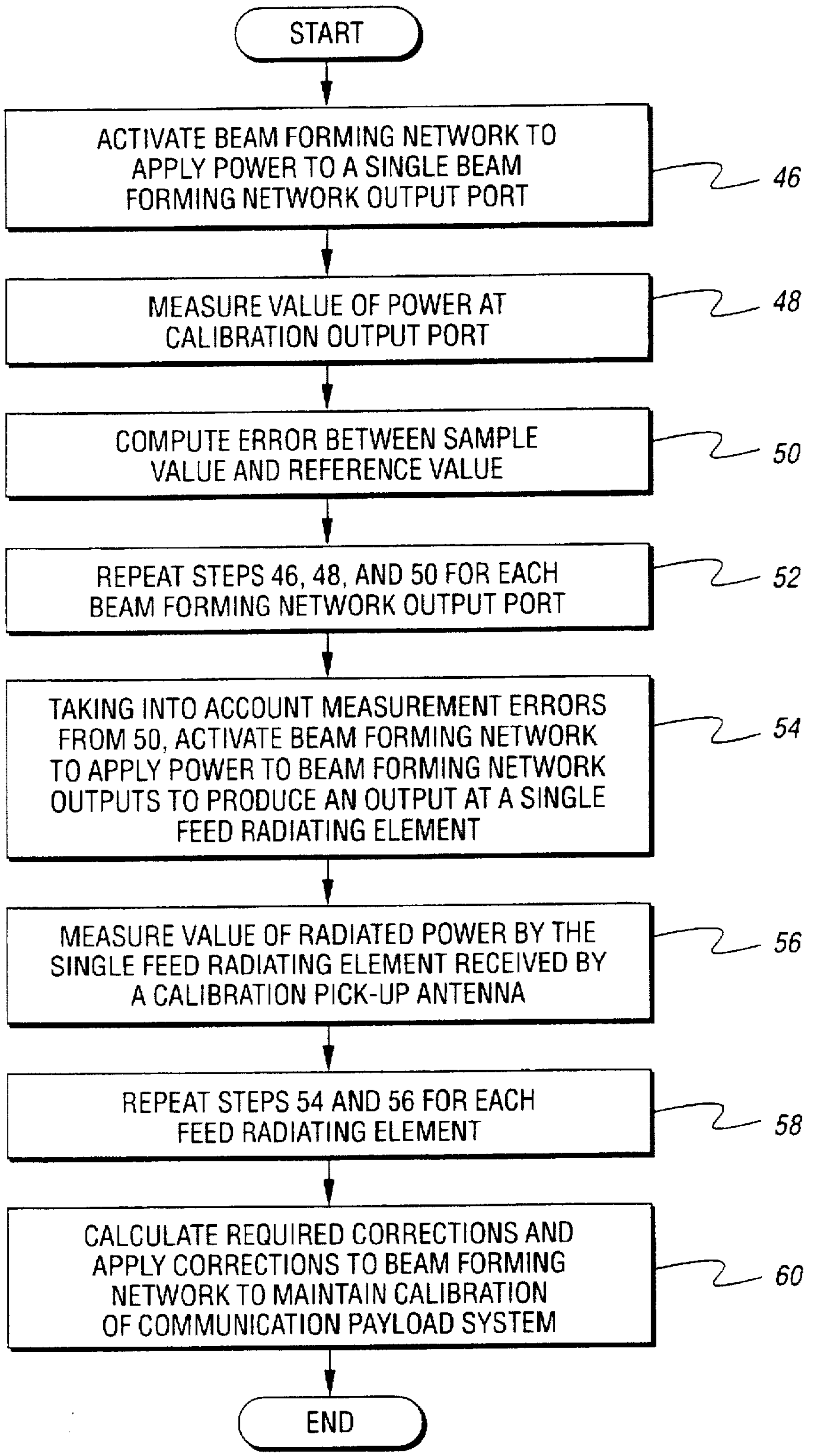
FIG. 3 is a flow diagram used to explain the operation of the calibration of the payload system.

The operation of the calibration system 40 will now be discussed relative to the flow diagram shown in FIG. 3. The calibration process is initiated by activating the beam forming network 30 to apply power to a single output port as described in block 46. This application of power to a single output port will produce an output at a predetermined calibration output port. The calibration system will then measure the value of the power at the calibration output port (block 48) then compute an error between the measured value and a reference value, block 50. The reference value may be a theoretically derived value, or the value from a preceding measurement. The steps recited in blocks 46 through 50 are repeated for each output port of the beam forming network as indicated in block 52.

The calibration system 40 will then activate the beam forming network 30 to apply power to the output ports preselected to produce an output at one of the feed radiating elements 36, block 54. The calibration system will then measure the value of the power radiated by the feed radiating element 36 using the calibration pick-up antenna 44, as indicated by block 56. The processes of blocks 56 and 58 are repeated until the power radiated by each feed radiating element 36 is measured as indicated by block 58. Finally, the calibration system will calculate corrections to the beam forming network and apply these corrections to the beam forming network to maintain the calibration of the payload system (block 60).

Figure 4:
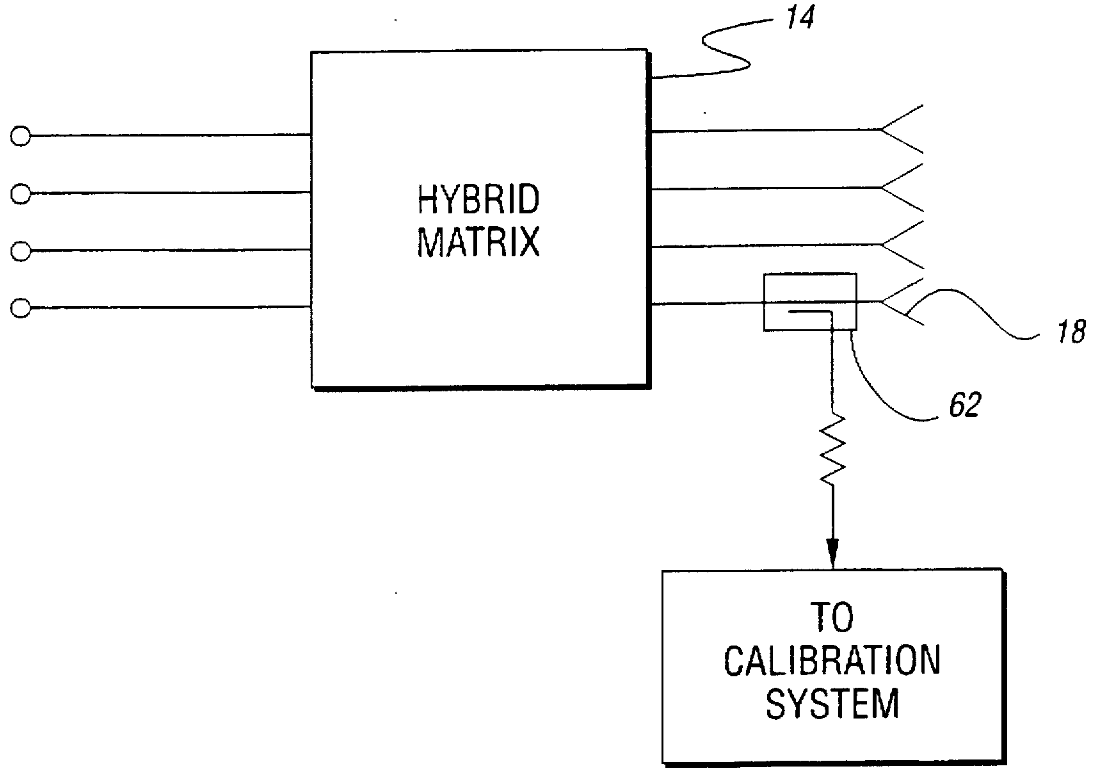
FIG. 4 is a diagram of an alternate embodiment of a calibration sample output port.

An alternate embodiment of the calibration output port for generating a calibration signal from the hybrid matrices 14 is illustrated in FIG. 4. In this method, a sampling coupler 62 is connected to the lead between the hybrid matrix 14 and the feed radiating element 18. The calibration sample generated by the sampling coupler 62 is input to the calibration system 40 the same as the calibration sample produced by the RF absorbing load 38 discussed relative to FIG. 2.

The calibration process may be performed either in the absence of other signals input to the beam forming network or in the presence of other signals input into the beam forming network, the latter by coding or other means distinguishing the calibration signals from the other signals.

The key parts of the invention are the use of a hybrid matrix system having more input ports than outputs ports to increase the total amount of power out without increasing the power out of the individual amplifiers and the use of the unused outputs of the hybrid matrices normally connected to a feed radiating element or an RF absorbing load to produce a sample of the power in the hybrid matrix to periodically calibrate the payload system.

Having disclosed a preferred embodiment for the calibration of a satellite communication payload having hybrid matrices, it is recognized that those skilled in the art may make changes or improvements thereto within the scope of the appended claims.

What is claimed is:

1. A communication payload system comprising:

a beam forming network having at least one input port and a plurality of output ports, said at least one input port being mapped to selected output ports, said beam forming network providing an appropriate amplification and phase shift between said at least one input port and said output ports;

a plurality of amplifiers, each amplifier of said plurality of amplifiers having an input connected to a respective one of said output ports of said beam forming network and an output;

at least one hybrid matrix having a predetermined number of inputs and a corresponding number of outputs, said predetermined number of inputs of said at least one hybrid matrix being connected to said output of a respective one of said plurality of amplifiers;

a calibration sample output port connected to one of said outputs of each of said at least one hybrid matrix, said calibration sample output port producing a first calibration sample having a value corresponding to the power output from said hybrid matrix; and a calibration system responsive to at least said first calibration sample to generate corrections applied to said beam forming network to maintain the calibration of said payload system.

2. The communication payload system of claim 1 wherein said at least one hybrid matrix is a plurality of hybrid matrices, each hybrid matrix of said plurality of hybrid matrices having said predetermined number of inputs each input connected to the output of a respective one of said plurality of amplifiers.

3. The communication payload system of claim 2 further including a plurality of feed radiating elements, each of said feed radiating elements connected to a respective one of the remaining outputs of each of said hybrid matrices.

4. The communication payload system of claim 3 further comprising a calibration pick-up antenna responsive to the power radiated by the feed radiation elements to generate a second calibration sample, and wherein said calibration system is responsive to said first and second calibration samples to generate said corrections applied to said beam forming network.

5. The communication payload system of claim 2 wherein said predetermined number of inputs to each of said hybrid matrices is four and said predetermined number of outputs is four and wherein each hybrid matrix of said plurality of hybrid matrices has one of said calibration sample output ports RF connected to one of said four outputs.

6. The communication payload system of claim 5 wherein said calibration sample output port is an RF absorbing load adapted to generate said calibration sample.

7. The communication payload system of claim 5 wherein said calibration sample output port is a sample coupler disposed between one output of said hybrid matrix and its associated feed radiating element producing a calibration sample corresponding to the power transmitted from the hybrid matrix to the feed radiating element.

8. The communication payload system of claim 4 wherein said feed radiating elements are placed at the focal point of a beam forming device.

9. The communication payload system of claim 4 wherein said feed radiating elements are placed near the focal point of a beam forming device.

10. The communication payload system of claim 4 wherein said calibration circuit applies power to a single output port of said beam forming network to produce at least a first calibration sample at said calibration sample output port, applies power to selected output ports of said beam forming network to power a selected one of said feed radiating elements to radiate power detected by said calibration pick-up antenna to produce said second calibration sample and calculating said correction data in response to said first and second calibration samples.

11. The communication payload system of claim 1 wherein said communication payload system is a communication payload system of a satellite.

12. A method for calibrating a communication payload system having a beam forming network having input ports mapped to selected output ports, at least one hybrid matrix having a plurality of inputs and a plurality of outputs, each input respectively connected to a respective one of said output ports of said beam forming network, a calibration output port connected to one output of said at least one hybrid matrix and a plurality radiating element one connected respectively to each of the remaining outputs of the at least one hybrid matrix, and a calibration system connected between the calibration output port and the beam forming network, said method comprising the steps of:

applying power to the inputs of the beam forming network by the calibration system, to produce one at a time power at each output port of the beam forming network;

measuring the value of the power produced at the calibration output port of said beam forming network connected to at least one hybrid matrix to generate first calibration samples;

applying to inputs of the beam forming network by the calibration system to produce power at the outputs of the beam forming network selected to produce a power output to each feed radiating element, one at a time;

measuring the value of the power radiated by each feed radiating element to generate second calibration samples; and calculating a correction by the calibration system applied to said beam forming network to maintain the calibration of said payload system in response to said first and second calibration samples.

13. The method of claim 12 wherein said step of calculating a correction further includes the step of comparing said first calibration samples to a reference sample to generate an error in the calibration of the payload system, said error being used by said calibration system to calculate said correction.

* * * * *